Jan. 5, 1954  F. WALLER  2,664,781
PHOTOGRAPHIC APPARATUS FOR CORRECTING
NEGATIVES DURING PRINTING THEREOF
Original Filed Feb. 4, 1948  3 Sheets-Sheet 1
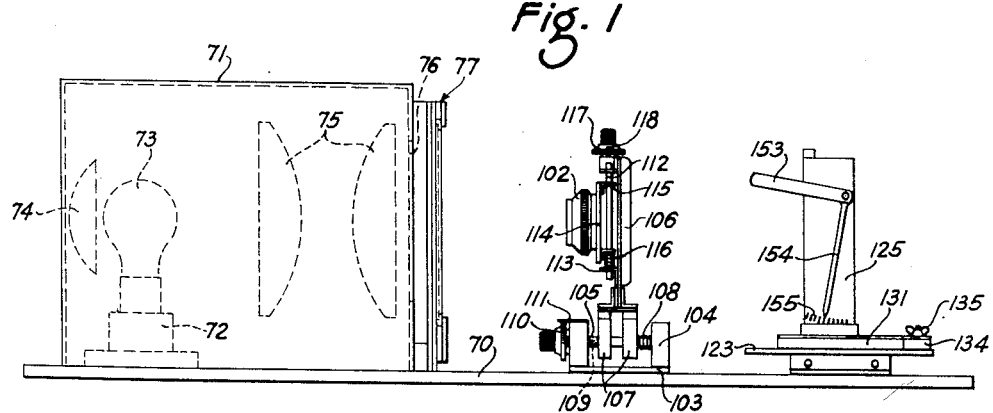
Fig. 1
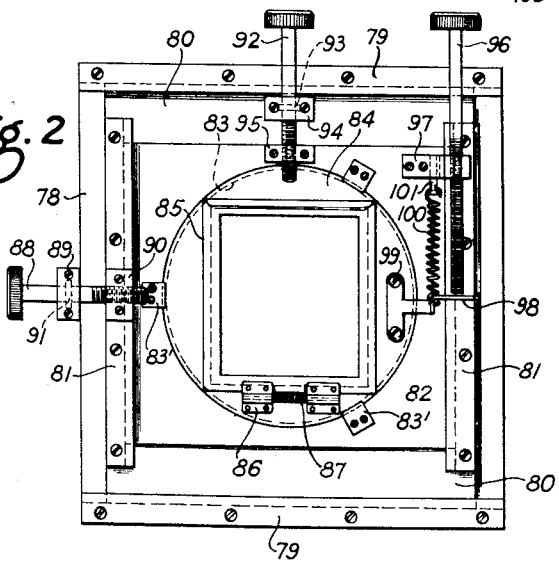
Fig. 2
Fig. 3
Fig. 4
Fred Waller
INVENTOR
BY
ATTORNEYS

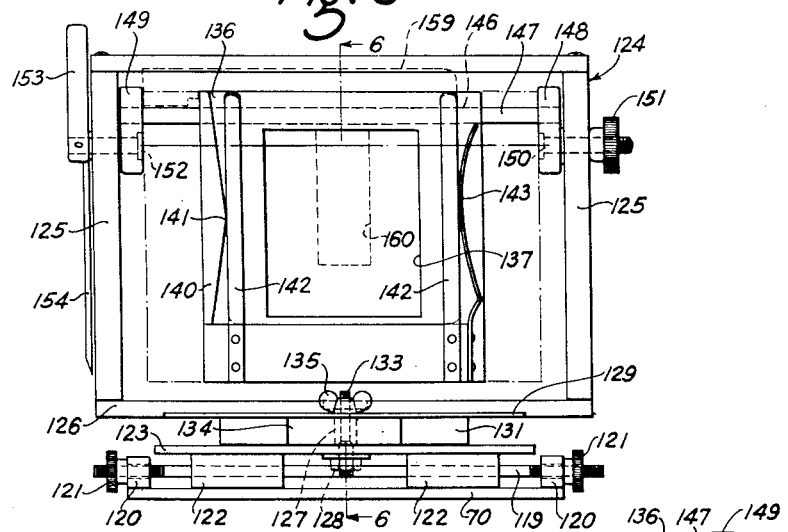
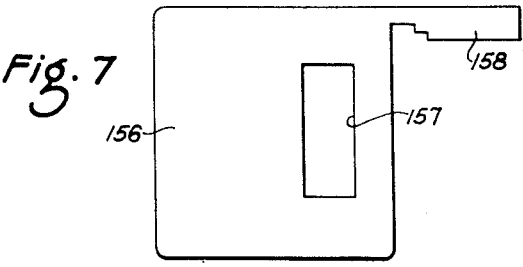
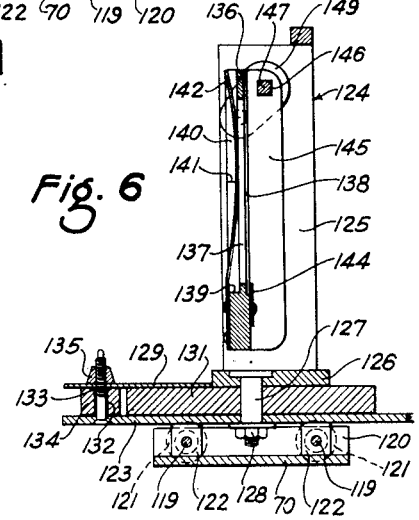
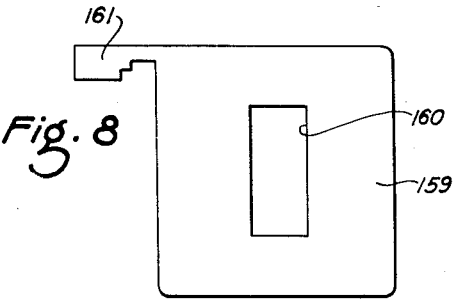
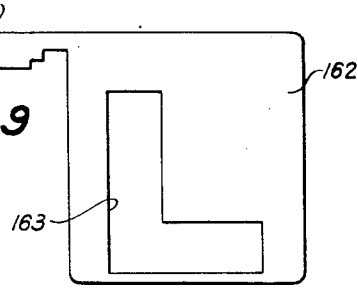

Jan. 5, 1954     F. WALLER     2,664,781
PHOTOGRAPHIC APPARATUS FOR CORRECTING
NEGATIVES DURING PRINTING THEREOF
Original Filed Feb. 4, 1948     3 Sheets-Sheet 3
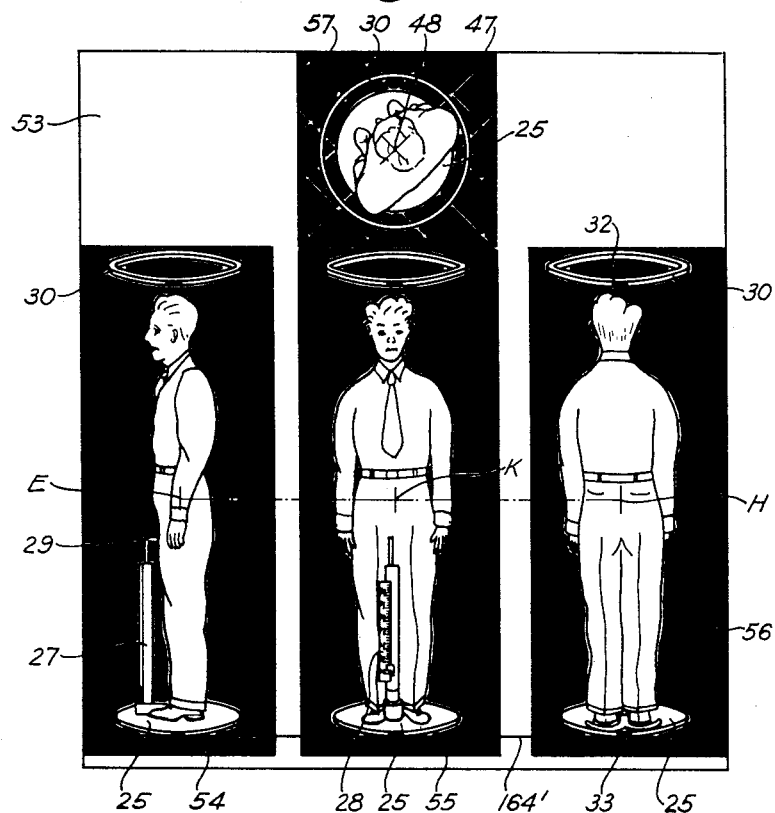
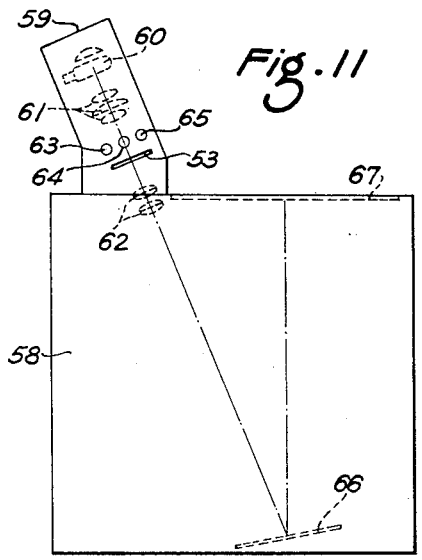
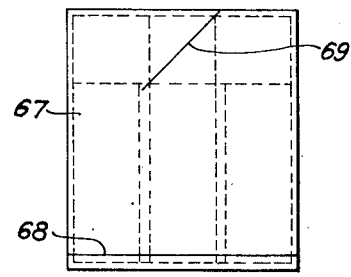
Fred Waller
INVENTOR Patented Jan. 5, 1954

2,664,781

UNITED STATES PATENT OFFICE 2,664,781

PHOTOGRAPHIC APPARATUS FOR CORRECTING NEGATIVES DURING PRINTING THEREOF

Fred Waller, Huntington Station, N. Y., assignor, by mesne assignments, to The Henry Booth Methods Corporation, New York, N. Y., a corporation of Delaware Original application February 4, 1948, Serial No. 6,217. Divided and this application September 30, 1949, Serial No. 118,928

3 Claims. (Cl. 88—24)

The present invention relates to photography and more particularly to a photographic apparatus in which a photographic negative containing several aspects of an object or person is corrected by printing each aspect individually in a position determined by observation of some other aspect of the object or person and is a division of my copending application Serial No. 6,217, filed February 4, 1948.

While it is known that photography may be used for making measurements of an object, or of a person, known methods and apparatus are not sufficiently complete or accurate enough to permit the procurement of all the required measurements or information. Furthermore, it has not before been commercially practical to obtain by means of a single photograph all the contours and dimensions necessary to make the patterns for a suit of clothes so that the perfect fit can be obtained without one or more try-ons.

The primary object of the present invention is the provision of an apparatus by which a single photograph of an object or person can be correctly printed, and from which can be made all the measurements necessary to determine the contour and size of the object or of a person.

Still another object of the invention is the provision of an apparatus for printing a corrected photograph from a photographic negative having a plurality of aspects of an object or person, each aspect of the object or person being printed individually in a position determined by observation of some other aspect of the object or person.

Still another object of the invention is the procurement of a photograph having three laterally spaced images of lateral aspects of the object and having a fourth area above the laterally spaced areas for an image of the top of the object, all of said images having been printed individually with corrections in the optical printer of the invention.

Other and further objects of the invention will be suggested to those skilled in the art from the description which follows.

In the illustrated embodiments of the invention like reference characters designate similar elements shown in the drawings which consist of the several views as follows:

Fig. 1 is a side elevation of an optical printer, according to the invention;

Fig. 2 is a front view and Fig. 3 is a side view of the negative holder of the optical printer;

Fig. 4 is a top view and Fig. 5 is an elevation of the holder for the sensitized material to be printed;

Fig. 6 is a vertical cross section of the holder for the sensitized material taken on the line 6—6 of Fig. 5;

Figs. 7, 8 and 9 are elevations of masks alternately to be placed in the holder for the sensitive material;

Fig. 10 is a plan view of a photograph which has been or may be corrected by the apparatus disclosed herein;

Fig. 11 is a diagrammatic side elevation of a viewer for determining displacements of the images from their plane of interest or focal plane; and Fig. 12 is a plan view of the screen of the projector shown in Fig. 11.

A photograph 53, such as shown in Fig. 10, comprises profile, front, back and top views of the object or person on the object support and may be produced by an apparatus of the type described in my copending applications Serial No. 6,217, filed February 4, 1948, and Serial No. 118,927, filed September 30, 1949. Such photograph has three laterally spaced image areas 54, 55 and 56 and a fourth area 57 above said laterally spaced image areas for a top view of the object or person. Such photograph 53, in addition to the respective images of the object or person, also contains images of the circular disk 25, of the ring 30, the index marks 32 and 33 thereon, of the in-seam measuring device and scale 28, a top view of the ring 30 with the reference cross 48 at the center thereof. Also, the top view shows the disk 25 within the circular ring 30. Such photograph provides a check upon the proper location of the objects of known dimensions, disk 25 and ring 30, and of any of the mirrors used in making the original negative. For instance, if any one of the mirrors is inadvertently shifted, the size or alignment of the images of disk 25 and ring 30 will be altered to indicate immediately that correction is required in that particular studio. The photograph 53 may also include, in a known manner, a harness of measuring tapes on the person being photographed.

The photograph 53 may now be placed in a viewer or projector 58, see Fig. 11, having a lamphouse 59 containing a conventional light source 60, condenser lenses 61, objective lenses 62 and vertical, lateral and rotatable adjustments for the photograph 53 obtained in a known manner respectively by the knobs 63, 64 and 65. The image beam in projector 58 is reflected by a mirror 66 onto a screen 67. Preferably, the screen 67 is etched or otherwise provided with a horizontal reference line 68 and a diagonal reference line 69, as shown in Fig. 12.

By means of such a projector it is possible to observe the displacement of any of the images of lateral aspects of the object with respect to each other, the amount that the object is twisted, tilted, or leans to one side or the other. Any such displacement of the person from the mutually perpendicular planes defined by the index marks 32 and 33 or from the line of their intersection indicated by reference cross 48 results in changing the scale of the image because the scales of the images are exactly equal only along lines measured in the focal or reference planes defined by the reference marks. Since it is not possible to always position a person to be photographed with such reference planes precisely intersecting the profile and broadside view of the person, and since for tailoring purposes it is preferable to have the person assume a natural position, it sometimes is necessary to correct the images on the photograph 53 before taking the measurements to be used in making the wearing apparel. For this purpose, the projector 58 can be used to determine from the image area 57 the amount that the person is tilted with respect to the vertical plane defined by the reference marks 32 and 33 in image area 54 or from the intersection of the reference planes defined by the reference cross 48 in image area 57. Similarly, by observation of image areas 55 and/or 57, the amount that the person is leaning to one side or the other can be ascertained by comparison of the person's image with the reference marks 32 and 33 in image area 55 and with reference cross 48 in image area 57.

If desired, the amount of such leaning to one side or the other can be verified by comparison of the person's image with the reference marks 32 and 33 in image area 56. Finally, observation of the top view of the person in image area 57 permits determination of the amount that the person is twisted and for this purpose comparison is made with the diagonal reference line 69 and with the images of the diagonal lines 47 on the floor of the studio. While it is preferable to make the checks on mirror positions and on positions of disk 25 and ring 30 in the projector 58, it will be apparent that such check and the determinations of displacements of the person can be made directly on the photographic negative or in the optical printer next to be described.

The optical correction of the photographic images obtained constitutes an important refinement in the method and apparatus of measuring objects by photography and particularly for a method and apparatus providing photographs to be measured for the making of wearing apparel for people. Such optical correction is advantageously accomplished in an optical printer comprising generally an illuminating and optical system, a negative holder, an objective lens, and a sensitized material holder. The aforementioned parts of the optical printer, according to the invention, are mounted upon a base plate 70.

A lamphouse 71 on base plate 70 contains a lamp receptacle 72, a lamp 73, a reflector 74 and a pair of condenser lenses 75. One end of the lamphouse 71 is provided with an opening 76 through which a beam of light is projected.

A negative holder indicated generally as 77 in Fig. 1 is positioned to support a photographic transparency in registry with opening 76. Specifically, a base plate 78 is attached to the open end of lamphouse 71 and a pair of spaced horizontal guideways 79 are fastened to base plate 78, as shown in Fig. 2. A laterally movable plate 80 is mounted with its upper and lower edges in guideways 79 and in turn carries a pair of vertical guideways 81. A vertically movable plate 82 has its side edges engaging guideways 81 and is provided with a circular counter-bored opening 83. A rotary mounting plate 83 is mounted for rotation within said opening 83, is held therein by a plurality of lugs 83', and carries a negative frame 85 mounted thereon by hinges 86 and spring pressed thereagainst by a coil spring 87. Thus, the negative or photograph 53 can be mounted on plate 84 merely by opening the frame 85, inserting the negative and releasing the frame 85 for spring pressure against the negative or transparency.

Horizontal, vertical and rotary adjustments are preferably provided for the negative holder. Horizontal adjustment is obtained by means of a thumbscrew 88 rotatably supported in a journal block 89 on base plate 78 and threaded into a screw block 90 on plate 80 over one of the vertical guideways 81. A flange 91 on thumbscrew 88 prevents axial movement of the thumbscrew with respect to journal block 89 and so that rotation of thumbscrew 88 moves the laterally movable plate 80 to one side or the other, as viewed from Fig. 2. A second thumbscrew 92 has a flange 93 rotatably mounted in a journal block 94 on plate 80 and engages a screw block 95 on the vertically movable plate 82. Thus, rotation of thumscrew 92 will raise or lower the negative holder, as viewed from Fig. 2.

Another thumbscrew 96 is threaded through a screw block 97 on plate 82 and has its end engaging against the end of a tongue member 98 which is mounted by screws 99 upon the rotary mounting plate 84. A coil spring 100 has one end attached to tongue member 98 and the other member attached to a post 101 on screw block 97. As a result, the rotary mounting plate 84 is normally pressed against the end of the thumbscrew 96 which is rotated in one direction or the other to rotate the mounting plate 84 and the photographic transparency thereon in one direction or the other.

The objective lens 102 is mounted for vertical and longitudinal movement in any suitable manner, such as that shown in Fig. 1. Specifically, a base member 103 has a pair of spaced members 104 between which a pair of rods 105 extend. A carriage frame 106 includes a pair of spaced blocks 107 mounted to slide on said rods 105. Coil springs 108 encircle rods 105 and normally urge the carriage frame 106 and blocks 107 against the end of a rod 109 which is threaded through one of end members 104 and which has a graduated knob 110 moving with respect to a pointer 111 on end member 104. Rotation of knob 110 will, therefore, cause movement of the carriage frame 106 and objective lens 102 longitudinally of the optical printer as shown in Fig. 1. A pair of vertical rods 112 are mounted between brackets 113 on carriage frame 106 and an objective mount 114 has perforated ears 115 slidable on said rods 112. Coil spring 116 encircle rods 112 and urge the objective mount 114 and objective lens 102 therein upwardly and against the end of a threaded rod (not shown) which bears against the upper surface of objective mount 114, which is threaded through carriage frame 106 and which is operated by a graduated knob 117. An index member 118 permits observation of the adjustment of knob 117 or its return to a known position.

The holder and mounting means for the light-sensitive material to be exposed or printed makes it possible to adjust such material with respect to the negative in three senses, namely, transversely, vertically and rotatably to tilt the material with respect to the negative. The specific means for obtaining such adjustments can be provided in several ways but one convenient arrangement of such adjustments is illustrated in Figs. 4, 5 and 6. One lateral adjustment for such a holder is accomplished by a pair of threaded rods 119 extending at each end through a pair side rails 120 on base 70 and carrying thumb nuts 121. A pair of blocks 122 are mounted in spaced relation on each of threaded rods 119 and are fastened to a circular support plate 123. A rectangular supporting frame 124 comprises side arms 125 and a bottom member 126 which is fastened by a headed stud 127 and nut 128 to support plate 123 for rotation thereon. A semi-circular guide plate 129 is fastened by screws 130 to an intermediate turntable 131 and is provided with an arcuate slot 132. A threaded bolt 133 extends upwardly through supporting plate 123, a spacing block 134 and slot 132 for engagement by a winged nut 135. By means of the adjustments described, it is possible to displace the supporting frame 124 transversely of the base plate 70 and also to rotate the supporting frame 124 about a vertical axis through the headed stud 127. The lateral adjustment accomplished by adjustment of the thumb nuts 121 will permit aligning of the vertical axis of rotation with the optical axis of the objective lens 102 and loosening of wing nut 135 will permit rotation of the supporting frame around such vertical axis to bring the plate into parallelism with the negative or transparency in the negative holder.

The plate holder proper, see Figs. 5 and 6, comprises a frame 136 provided with an exposure opening 137 and a mask guideway 138. Said frame 136 has a bottom ledge 139 and a lateral shoulder 140 with a central peak 141. A pair of leaf springs 142 are mounted on ledge 139 and extend upwardly to press a sheet of sensitive material against the frame 136. Another leaf spring 143 is mounted on the end of bottom ledge 139 for engaging the edge of a sensitized plate to urge its other edge against the peak 141 of lateral shoulder 140. A pair of clips 144 are mounted on frame 136 to engage the lower edge of a mask to be later described, and which may be inserted in the mask guideway 138.

Frame 136 also includes a pair of laterally spaced side members 145 which are each provided with square apertures 146. A square rod 147 extends through said apertures 146 and has its ends respectively mounted in crank members 148 and 149. Crank member 148 is operatively connected to side arm 125 by a headed stud 150 and thumb nut 151. Crank arm 149 is rotatably mounted on the other side arm 125 by means of a headed stud 152 carrying on its outer end a handle 153 and a pointer 154 movable over a scale 155 on the outer face of side arm 125. As a result, the frame 136 can be moved laterally on rod 147 to center any of the laterally spaced image areas of the photograph over the vertical axis through headed stud 127. Furthermore, upon loosening of thumb nut 151 the frame 136 can be tilted to a position which has been predetermined and which is indicated by the pointer 154, whereupon thumb nut 151 is tightened and such tilted position is maintained. It should be noted that headed studs 150 and 152 are in axial alignment and that the axis of tilting for frame 136 substantially coincides with the foot line of a photograph or a horizontal line contacting the images of disks 25 at the reference marks 32 in each of the images of the lateral aspects of the object or person.

Each of the images of lateral aspects of the object are printed individually so that a different correction can be made during each printing step. For this purpose, a series of masks are provided for insertion into the guideway 138. One such mask 156, see Fig. 7, is provided with a rectangular opening 157 so that the image of the view at one side of the photograph or transparency 53 can be printed. A projection 158 extends laterally from the upper edge of mask 156 and is arranged so that the mask cannot be completely inserted into the guideway 138 until the frame 136 has been moved laterally on rod 147 to bring the vertical center line of opening 157 into coincidence with the vertical axis through the headed stud 127. A second mask 159 is provided with a central vertical opening 160 and has a lateral projection 161, see Fig. 8. As before, the projection 161 prevents the insertion of mask 159 completely into the guideway 138 until the same has been centered so that the vertical center line 160 coincides with the vertical axis of headed stud 127. Finally, mask 162, see Fig. 9, is provided with an L-shaped opening 163 and has a projection 164. Said projection 164 prevents complete insertion of said mask 162 until the vertical portion of the opening 163 has its center line over the vertical axis of headed stud 127. The horizontal portion of opening 163 permits the printing of the top view simultaneously with one of the lateral views because a corrected image of the top view is seldom required.

The method of operation of the optical printer just described will next be explained. The fundamental principle embodied in practicing the method of the invention is that the position of each aspect of the object is corrected during printing by an amount determined by inspection or measurement of an image of some other aspect of the object or person. Such correction is accomplished by orientation including lateral adjustment, vertical adjustment, rotation or tilting of the sensitized material with respect to the photographic transparency in the negative holder. While it is possible to make corrections for vertical or lateral displacement of the image and/or tilting, twisting or leaning of the person photographed, it often happens that only one or two of such corrections need be made.

For example, the photograph 53, for some reason, such as a slight displacement of a mirror, may have one of the images of a lateral aspect above the foot line 164'. This vertical displacement could be determined by laying a straight edge across the negative or by observation with respect to the horizontal reference line 68 when the negative is viewed in the projector 58. Correction of such vertical displacement would be accomplished in the optical printer, when that image of the lateral aspect is being printed, by adjusting the thumbscrew 92 on the negative holder to bring the image of the reference mark 32 onto the same horizontal line with the other images. Such an adjustment can be facilitated by the insertion of a clear glass plate with a horizontal etched line thereon into the frame 136. Likewise, lateral shifting of the image of a lateral aspect of the person can be accomplished by adjustment of the thumbscrew 88 on the negative holder. Finally, angular displacement of any image can be corrected in the optical printer by adjustment of the thumbscrew 96. Such adjustments are primarily for correction of inadvertent displacements of the mirrors or objects of known dimension in the studio described in the aforementioned applications.

The adjustments of the objective lens 102 are seldom necessary once the longitudinal adjustment has been set for proper ratio of the negative and positive image sizes which should be one-to-one. The adjustment of graduated knob 117 merely raises or lowers the lens 102 for proper centering of the lens with respect to the transparency.

Also, the lateral adjustment of the sensitive material holder by means of thump nuts 121 need not be changed once the vertical axis through the headed stud 127 has been moved to intersect the optical axis through objective lens 102. The other adjustments of the sensitive material holder are for the purpose of correcting the position of the object or person photographed. The person being photographed as previously mentioned, may be tilted forwardly or rearwardly of the plane defined by one set of opposite pairs of the index marks 32 and 33. The amount of such tilting can best be determined from the profile view but may also be determined by the amount that the estimated center of the person's head is displaced from the reference cross 48. Inasmuch as an angular determination of the amount of tilting is required to set the frame 136 at a corresponding angle of tilting, the determination of this correction is preferably made from the profile view. Assume a forward tilt in the profile view of 10°, which is not unusual in actual practice. When mask 159 is in place for printing of the front view of the person, the handle 153 is rotated through the angle determined by inspection, in this case 10°, of the profile view and the exposure of the sensitive material is made. The result of such exposure is in effect to obtain an image of the person as though a position were taken with the plane of interest of the person coinciding with the plane defined by the index marks 32 and 33. The same correction may be made with an opposite angle of tilting, such as an angle of 10° in the other direction and exposure of the area for printing the back view.

Assume now that the person is twisted during photographing some 15° as determined by inspection of the top view. As before, the amount of twist can be measured directly on the negative or with respect to the diagonal reference line 69 on the screen 67 of projector 58. Such correction is applied during printing of the front and rear views of the person by loosening the wing nut 135 and swinging the supporting frame 124 around a vertical axis through an angle of 15° or angle corresponding to the amount of the twist found from the top view of the person photographed. As before, the projections on the masks will not permit the printing of the front and back views until the area to be printed is centered over the vertical axis of rotation of supporting frame 124. While not generally necessary, it is within the scope of the invention that two corrections may be applied simultaneously to a single view. For example, the frame 136 may be tilted through a determined angle to correct for tilting of the person and may be rotated around a vertical axis to correct the twist of the person at the same time and the printed image will be corrected in two respects. Also, at this point it is noted that the least likely point of displacement is the foot line and all tilting corrections are made around such line as an axis. For this reason, the axis of rotation through headed studs 150 and 152 substantially coincides with the foot line for the view being corrected and which is generally common to all of the lateral views being printed.

After printing of the sensitive material or plate, according to the method and in the apparatus just described, the sensitive material is processed by known photographic methods to develop the latent image thereon. Generally and preferably, a positive image is obtained at this point with dark backgrounds on account of the dark strips on the studio floor, walls and ceiling, as described in my pending application Serial No. 118,927 filed September 30, 1949. The image of the person to be photographed will generally be light, providing good contrast to the background for measurement of outlines. Such contrast is of peculiar advantage in the present system and because true measurements are taken only along those portions of the image which are in the planes defined by the reference marks 32 and 33.

Since many variations of the apparatus disclosed herein are possible, the present disclosure is merely illustrative, and the scope of the invention is defined by the claims which follow.

Having now particularly described my invention, what I desire to secure by Letters Patent of the United States and what I claim is:

1. In an apparatus for photographic printing having an optical axis and a copy plane for receiving a plurality of projected images, the combination comprising a holder for receiving a light-sensitive material and for supporting said material in said copy plane and provided with a mask guideway, a support member mounted for rotation about a vertical axis, a slidable connection between said holder and said support member for permitting movement of said holder to center any one of said images with respect to said vertical axis, and a mask for insertion into said guideway, provided with an opening for receiving one of said images, and having a portion preventing complete insertion of said mask into said guideway until said holder has been moved along said slidable connection to center said mask opening with respect to said vertical axis.

2. In an apparatus for photographic printing having an optical axis and a copy plane for receiving a plurality of projected images arranged along a common base line displaced from said optical axis, the combination comprising a holder for receiving and supporting a light-sensitive material in said copy plane and provided with a mask guideway, a support member adapted to be rotated about a vertical axis, a transverse member slidably connected to the upper portion of said holder to center any one of said images with respect to said vertical axis, a mask for insertion into said guideway, provided with an opening for receiving one of said images, and having a portion preventing complete insertion of said mask into said guideway until said holder has been moved along said slidable connection to center said mask opening with respect to said vertical axis, and a crank means operatively connecting said member and said transverse member for tilting said holder about an axis fixed and displaced with respect to said optical axis and coinciding with the projected image of said base line in said copy plane.

3. In an apparatus for photographic printing having an optical axis and a copy plane for receiving a plurality of projected images arranged along a common base line displaced from said optical axis, the combination comprising a base, a holder for receiving and supporting a light-sensitive material in said copy plane and provided with mask opening, a vertical supporting frame for said holder, a mounting member for said frame, a pivotal connection between said supporting frame and said mounting member, a transverse adjusting means between said mounting member and said base for moving the vertical axis of said pivotal connection to intersect said optical axis, a cross bar transversely of said frame and along which said holder is transversely movable, a mask for insertion into said guideway, provided with an opening for receiving one of said images, and having an extending portion preventing complete insertion of said mask into said guideway until said holder has been moved along said cross bar to center said mask with respect to said vertical axis, and a crank member operatively connecting said frame and said cross bar for tilting said holder with respect to said copy plane about an axis fixed and displaced with respect to said optical axis and coinciding with the projected image of said base line in said copy plane.

FRED WALLER.

References Cited in the file of this patent

UNITED STATES PATENTS

| Number    | Name        | Date           |
|-----------|-------------|----------------|
| 1,113,549 | Franke      | Oct. 13, 1914  |
| 1,565,413 | Brock       | Dec. 15, 1925  |
| 1,652,271 | Cooke       | Dec. 13, 1927  |
| 1,654,070 | Corlett     | Dec. 27, 1927  |
| 1,713,498 | Cooke       | May 14, 1929   |
| 1,778,027 | Herriott    | Oct. 14, 1930  |
| 1,910,425 | Cahill      | May 23, 1933   |
| 1,911,142 | Cahill      | May 23, 1933   |
| 2,207,211 | Worlatschek | July 9, 1940   |
| 2,262,972 | Simmon      | Nov. 18, 1941  |